Dec. 18, 1962  R. BIRMANN  3,068,638
TURBOCHARGER FOR INTERNAL COMBUSTION ENGINES
Original Filed June 9, 1953  5 Sheets-Sheet 1

INVENTOR.
RUDOLPH BIRMANN
BY
ATTORNEYS

*INVENTOR.*
RUDOLPH BIRMANN
*BY*

ATTORNEYS

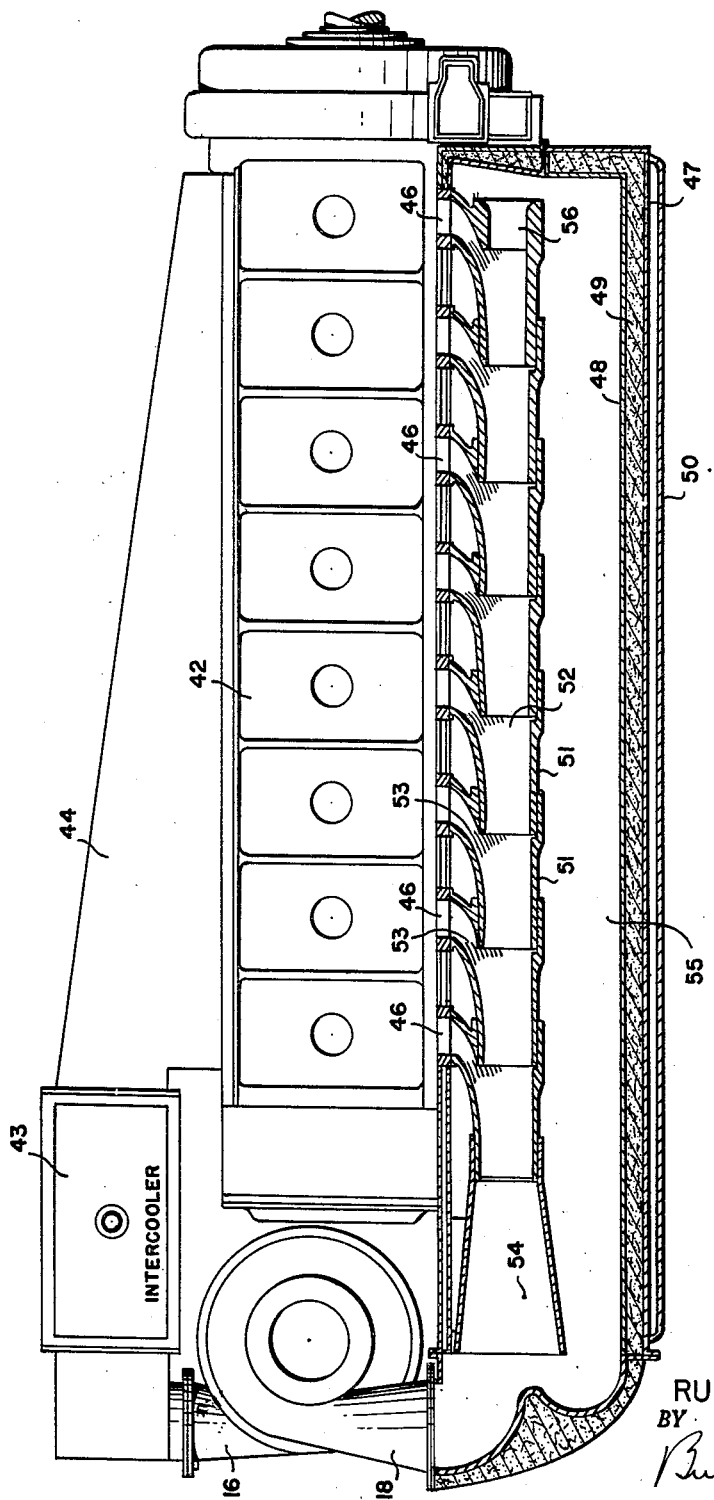

Dec. 18, 1962 R. BIRMANN 3,068,638
TURBOCHARGER FOR INTERNAL COMBUSTION ENGINES
Original Filed June 9, 1953 5 Sheets-Sheet 4

*INVENTOR.*
RUDOLPH BIRMANN
BY
ATTORNEYS

Dec. 18, 1962 R. BIRMANN 3,068,638
TURBOCHARGER FOR INTERNAL COMBUSTION ENGINES
Original Filed June 9, 1953 5 Sheets-Sheet 5
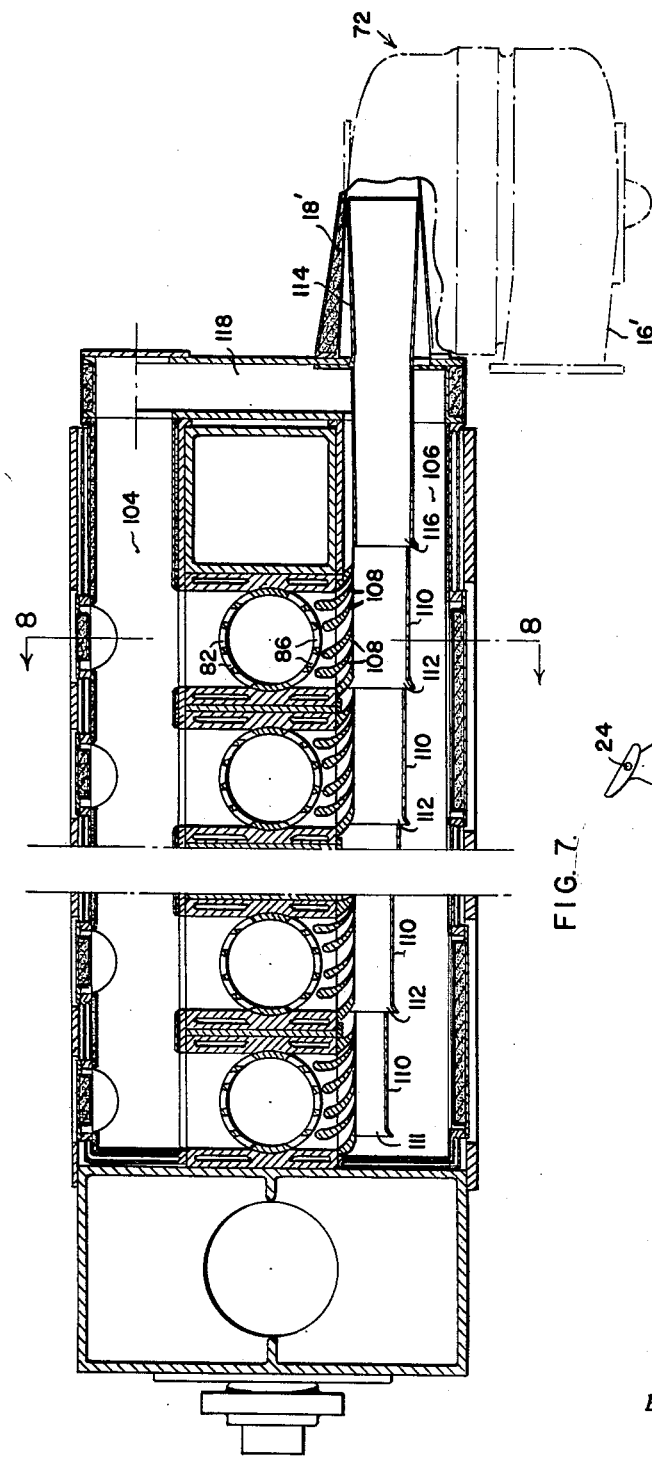
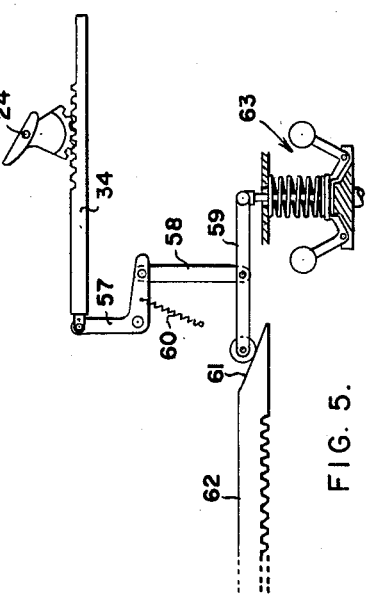
INVENTOR.
RUDOLPH BIRMANN
BY
ATTORNEYS

United States Patent Office 3,068,638
Patented Dec. 18, 1962

3,068,638
TURBOCHARGER FOR INTERNAL COMBUSTION ENGINES
Rudolph Birmann, Newtown, Pa., assignor, by mesne assignments, to De Laval Steam Turbine Inc., Trenton, N.J., a corporation of Delaware
Continuation of application Ser. No. 360,500, June 9, 1953. This application Sept. 22, 1960, Ser. No. 57,771
6 Claims. (Cl. 60—13)

This invention relates to the turbocharging of internal combustion engines, and while the invention is applicable to four-cycle engines of spark ignition type, it is particularly advantageous in connection with two-cycle diesel engines.

This application is a continuation of my application Serial No. 360,500, filed June 9, 1953, now abandoned.

Reference herein will be made primarily to the charging of two-cycle diesel engines, there being finally discussed the application of the invention to four-cycle engines.

Turbocharging of a two-cycle diesel engine is not as readily accomplished as with a four-cycle engine because of the following conditions:

(1) The two-cycle engine does not displace the exhaust gases by its own action but is dependent on a source of air supply, external to the cylinders, having a pressure sufficient to push out the exhaust gases and fill the cylinders with fresh air during the short time interval available for this phase of the cycle. This action must be accomplished during a crank travel of only about 90°. A suitable turbocharger could constitute the aforementioned external source of air supply during normal operation of the engine. Under conditions of light-load operation, however, and during idling the temperature of the exhaust gases is insufficient to permit such a unit to furnish the required quantity of air at a sufficient pressure. Furthermore, during starting no heated exhaust gases are discharged from the cylinders so that the turbine-blower combination is incapable of supplying the necessary combustion airflow to the engine, which makes it impossible for such an engine arrangement to be started.

(2) The specific air consumption of two-cycle engines (in pounds per brake horsepower hour) is much larger than that of four-cycle engines, which reflects in lower exhaust temperatures. This high specific air consumption is the result of the high combustion excess air (which must be used in order to prevent excessive thermal loading of the engine) and of the large amount of scavenging air needed for clearing the residual gases from the cylinders. The large combustion air excess reflects in rather low exhaust temperatures, which are further lowered by admixing of large amounts of scavenging air, to a point where the ability of the exhaust gases to yield useful work in the turbine is drastically reduced compared with four-cycle engines. Because of the aforedescribed low exhaust temperature in two-cycle engines and the correspondingly small amount of energy available to the turbine, it has been found that an ordinary turbocharger (which may give excellent results in conjunction with a four-cycle engine) cannot be used for charging a two-cycle engine, not even under conditions of full load, quite apart from the problems of starting, idling and light-load operation.

In my Patent No. 2,709,893, dated June 7, 1955, there is disclosed a type of turbo-compressor which, because of its high compressor efficiency at high compression pressure ratios, is capable of meeting the requirements for the charging of two-cycle engines. In this type of turbo-compressor unit the compressor is capable of producing the relatively high pressure ratio of at least 2.0 and the compressor and turbine efficiencies are between 82% and 87%. Both the compressor and the turbine have an extremely wide operating range over which stable operation with high efficiency is obtained. The turbine is cooled and is therefore capable of operating safely with considerably higher gas temperatures, gas pressure ratios and speeds, than are conventional uncooled turbines. The turbine furthermore is capable of converting into useful power output two or more flows having different available energies, such as the instationary flow or pulsations generally found in engine exhaust systems. This is accomplished without resorting to a subdivided nozzle box and partial admission which invariably leads to relatively low turbine efficiency in the attempt to recover energy from the exhaust pulsations.

The various objects of the invention will become apparent from the following description, read in conjunction with the accompanying drawings, in which:

FIGURE 4 is a diagrammatic plan view, partly in section, illustrating the association of a turbocharger of the type shown in FIGURES 1, 2 and 3 with a two-cycle diesel engine of a type in which the exhaust discharges from each cylinder through a single opening, for example, one having exhaust valves in the cylinder heads;

FIGURE 5 is a diagrammatic view showing the dual control of the turbine nozzle guide vanes by means of a fuel rack and a governor operated by the turbocharger;

FIGURE 7 is a horizontal section taken approximately as indicated at 7—7 in FIGURE 6 and as more specifically indicated at 7—7 in FIGURE 8;

FIGURE 9 is a diagrammatic section showing the application of the invention to a loop-scavenging, two-cycle diesel engine.

Figure 1:
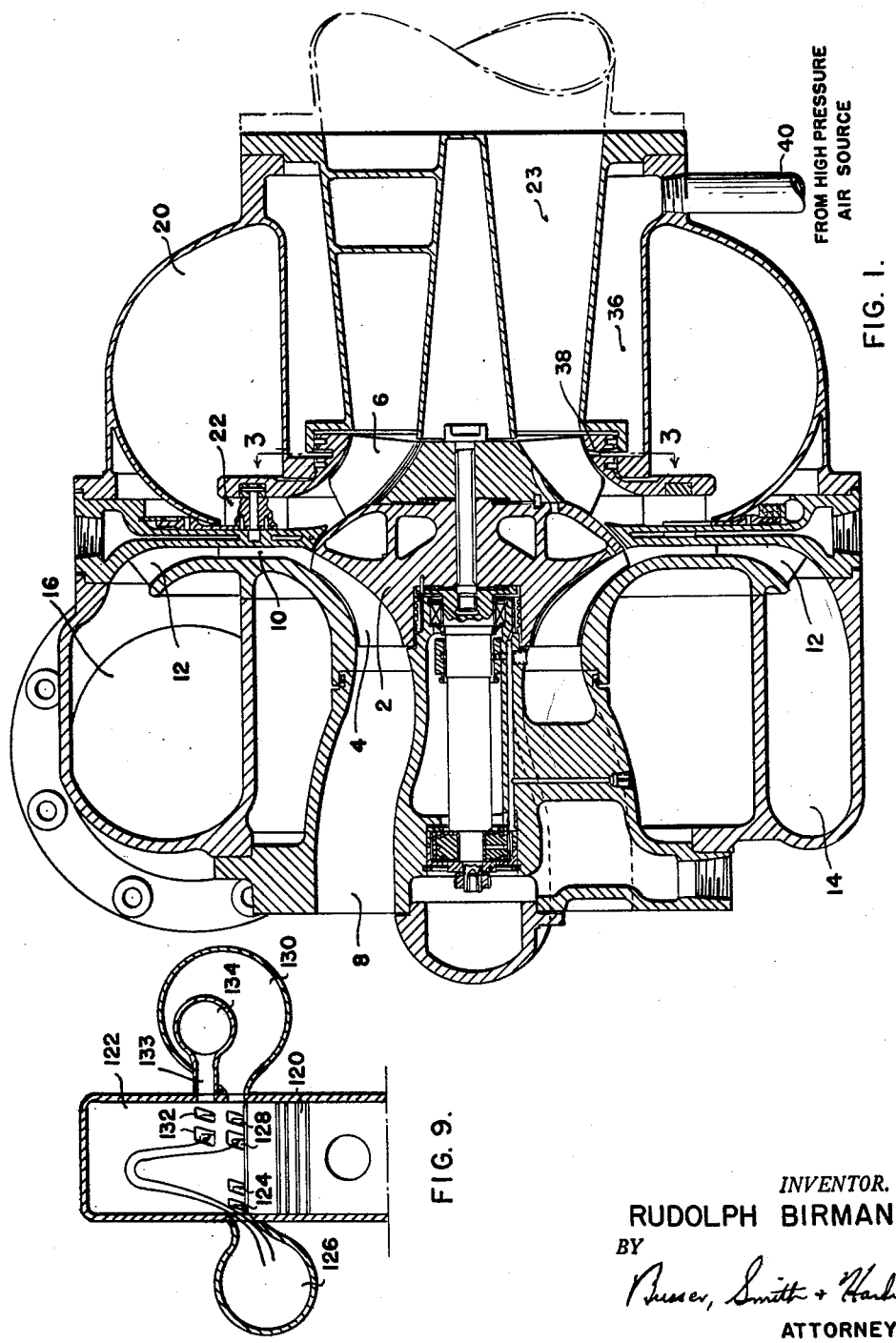
FIGURE 1 is a vertical axial section taken through a turbocharger provided in accordance with the invention and having adjustable nozzle vanes, the section being taken on the plane indicated at 1—1 in FIGURE 2.
Figure 2:
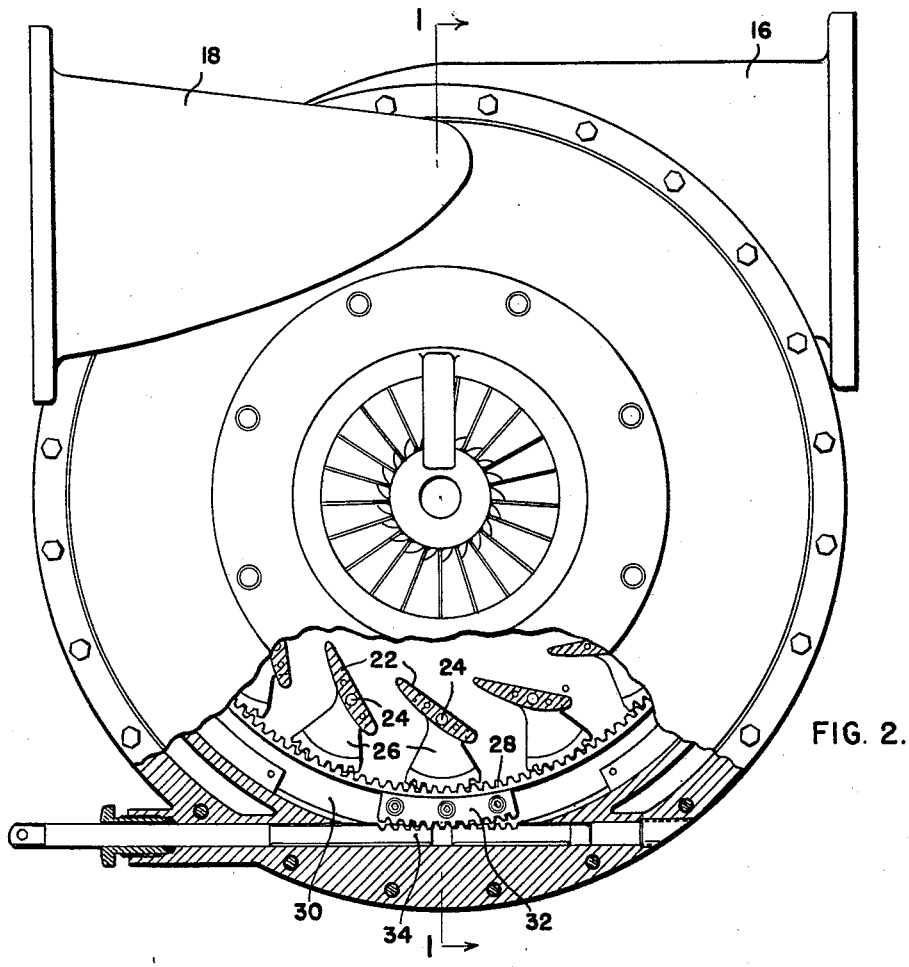
FIGURE 2 is an end elevation looking at the exhaust end of the turbocharger, the elevation being partly in section to show in particular the adjusting means for the nozzle guide vanes.
Figure 3:
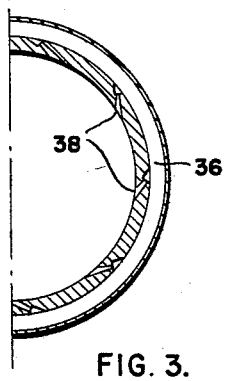
FIGURE 3 is a fragmentary section taken on the plane indicated at 3—3 in FIGURE 1 showing in particular air nozzles for operating the turbine of the turbocharger during starting or idling conditions.

Referring first particularly to FIGURES 1, 2 and 3 there is shown therein a turbocharger of the monorotor type particularly adapted for the practice of the present invention. The rotor 2 carries on opposite sides thereof the compressor blades 4 and the turbine vanes 6, the rotor construction and provisions for cooling, etc., being in accordance with the disclosure of my Patent 2,709,893, referred to above. The compressor receives its air through the inlet passage 8 and discharges through the vaneless diffuser 10 which may or may not be continued as a vaned diffuser indicated at 12. The combination diffuser which is shown serves to decrease the radial dimension of the turbocharger but under some circumstances it is desirable to have an entirely vaneless diffuser since the result is to secure a wider operating range of the compressor. Discharge from the diffuser passes into the scroll 14 having the outlet 16 which communicates with the engine intake manifold as hereafter pointed out.

Engine gases for driving the turbine pass through inlet 18 into the scroll 20 from which they flow through the nozzle passages defined by nozzle vanes 22, the flow being inwardly to the turbine vanes 6. The gases are discharged through the exhaust diffuser passage 23.

Vanes 22 are mounted on studs 24 which are fixed in the housing, there being secured to the vanes gear sectors 26 which mesh with the internal teeth 28 carried by a ring 30 which is guided in the housing for rotational movement about the axis of the rotor. To this ring there is secured a gear segment 32 which meshes with a slidably mounted rack 34. Lengthwise movements are imparted to this rack as hereafter described to adjust the openings between the nozzle guide vanes. Closure of the nozzle areas increases the pressure drop therethrough and the velocity of the gases approaching the turbine blades 6. For a given pressure drop the flow is less as these nozzle areas decrease.

To provide for starting there is provided an air chest 36 which discharges air through auxiliary nozzles 38 against the turbine blades, air being provided to the chest 36 through pipe connection 40 from the usual high pressure air supply which is used for starting a two-cycle diesel engine.

The association of the turbocharger with a two-cycle diesel engine of a type involving a single discharge opening from each cylinder is indicated in FIGURE 4. Air supplied by the charger passes through the intercooler 43 where suitable cooling takes place and thence into the intake manifold 44 of the engine 42. An eight cylinder engine is illustrated in FIGURE 4 though it will be understood that any suitable number of cylinders may be provided. The exhaust passages from the cylinders are shown at 46. Discharge takes place into a pulse converter which involves a large single duct manifold 47 extending through the entire length of the engine. This manifold is lined at 48 and insulated at 49 on its inside and water jacketed at 50 on its outside. The water jacket serves primarily to eliminate differential expansion between the engine and the manifold and thereby obviates the need for expansion joints. The insulation 49 is for the purpose of preventing heat loss from the gases within the manifold.

Inside the internally insulated manifold there are located exhaust elbows 51, one for each cylinder, which are nested, one within the other, as shown so as to form a straight and continuous passage 52 of gradually increasing cross-sectional area from one end of the engine to the other; i.e. the passage 52 has a cross-sectional area monotonically increasing step by step in the direction of flow therethrough. At the points where the exhaust elbows of the cylinders lead into the passage 52 the primary nozzles 53 are provided, one for each cylinder, and arranged to receive exhaust gases from the passages 46. These primary nozzles are so dimensioned that the pulsating portion of the exhaust energy from each cylinder is transformed therein into kinetic energy with the result that in passage 52 a high velocity flow is maintained, passage 52 thereby providing a common space into which the nozzles directly discharge.

A diffuser 54 is provided at the end of passage 52 for the purpose of decelerating and converting into pressure rise the high velocity maintained in passage 52. It will be noted that the common space or passage 52 provides for no substantial thermodynamic transformation of the gases between each of the nozzles 53 and the diffuser 54, the increase of cross-section to accommodate the gases added leaving unchanged the state of the previous gases in the passage. A portion of the exhaust gas flow discharging from the diffuser 54 is admitted to the turbine inlet passage 18. The remainder flows at very low velocity in the large space 55 of the exhaust chamber, surrounding the exhaust elbows, and re-enters passage 52 through nozzle 56, in order to maintain therein a steady high velocity flow.

From the aforegoing description of the arrangement, its function will be clear.

Since the high velocity passage 52 (as well as the engine exhaust ports) is in direct communication, by means of nozzle 56 at one end and diffuser 54 at the other end, with the large space 55, in which very low velocity prevails, the total pressure in the high velocity passage and that in the low velocity communicating space must be the same. It follows that the static pressure in the high velocity passage must be lower by the amount of the dynamic velocity head. The engine discharges, therefore, against a lower static pressure than that prevailing at the turbine inlet; or, in other words, the pulse converter system makes available to the engine a greater pressure differential between intake and exhaust manifolds than the turbocharger alone can produce. This is accomplished by utilizing the pulsating portion of the exhaust energy, which otherwise would be lost to both the engine and turbine. This pulsating portion of the exhaust energy is used to produce and maintain the high velocity in passage 52, with the result that during the initial portion of the exhaust phase in each cylinder there is involved an injector action, and during the final portion an eductor action, when the aforementioned high velocity educts the residual exhaust gases from the cylinders.

FIGURE 5 shows in diagrammatic form typical controlling devices of the unit. The rack 34 previously referred to is connected through bell crank 57 and link 58 to the central portion of a lever 59 which has at one end a roller engageable under the action of spring 60 with a cam 61 carried by the conventional fuel rack 62 which is manually or automatically adjustable to control the supply of fuel to the engine. The arrangement is such that the rack 62 moves to the right when the fuel supply is increased, and it will be seen that such movement is accompanied by a rocking of nozzle vanes 24 in a direction to open the nozzle passages.

The opposite end of level 59 is connected to the spindle of a conventional type of governor 63 which is geared to the engine shaft, the arrangement being such that decrease of speed of the engine will result in the rocking of the nozzle vanes to decrease the areas of the nozzle passages to maintain charger speed.

The arrangement so far described may be applied to a conventional two-cycle engine.

It will be evident from the above description that the desired operation in accordance with the introductory description is provided. When the engine is operating under full load conditions the fuel rack 62 will be in a right hand position and will maintain the nozzle areas at maximum. Under full load condition the exhaust gases from the engine have ample temperature to maintain the turbocharger operating at its full capacity supplying ample air to the engine for both combustion and scavenging purposes. As the load decreases and the fuel rack is moved either manually or automatically toward the left the nozzle areas are decreased resulting in adjustment of the turbine to proper condition for maintenance of its operation by preventing the usual excessive decrease of the pressure drop through the nozzles with decreasing gas flow. The result is that the turbocharge operation is maintained in such a manner that the compressor discharge pressure is higher than the turbine inlet pressure, even though less air is delivered to the engine; however, as pointed out above, this is satifactory since under partial load conditions less air need be supplied to the engine to prevent the operating temperature of the engine from becoming too high, there being nevertheless supplied ample air for scavenging purposes. The arrangement may be such as to secure a wide range of proper operation for conditions extending from full load of the engine to quite low loads.

If the engine is of constant speed type, the governor 63 may be omitted. However, if the engine is of variable speed type it is generally required that the charger shall operate to supply the necessary air under low speed conditions. The governor 63 responds to the engine speed to secure this result, the governor moving the nozzle vanes to reduce the nozzle areas when the engine speed decreases, thus maintaining the pressure drop through the nozzles despite the reduction of gas flow. This is consistent with the requirement that usually an engine is required to deliver high torque under low speed conditions than under high speed conditions and thus requires maintenance of the charging action.

Assuming a conventional engine, it will be evident that starting must be accomplished independently of the engine and also that the turbine must receive additional driving energy over that supplied by the exhaust gases under idling or quite low load conditions. This end is secured by the introduction of air through nozzles 38 to the turbine blades. As already indicated the air may be supplied from the usual starting air source for starting purposes. Under idling conditions this supply will in turn be supplied with air from the compressor associated with the engine and mechanically driven thereby, the air thus supplied being utilized for insuring that the turbocharger continues to operate. The driving of this compressor, of course, requires a certain amount of energy from the fuel supplied to the engine but the compressor provided for the purpose of maintaining the starting supply and, in the present instance, the auxiliary drive for the compressor may be of relatively small size capable of delivering a small quantity of air at high pressure.

Uniform supply of exhaust gases to the turbine is effected by the exhaust gas recirculating means shown in FIGURE 4. Those cylinders which have just had their exhaust ports opened will discharge gas at high pressure to the nozzles 53 where transformation to velocity occurs to produce a high rate of gas flow through passage 52. Other cylinders at the same time may be in the scavenging phases of their cycles and this high velocity flow will exert an eductor effect on the nozzles 53 corresponding to such cylinders, lowering the back pressure thereon and serving to augment the scavenging action by increasing the pressure drop between the inlet and outlet of the cylinders. Recirculation flow is maintained as described in the passages 52, 54, 55 and 56, there being drawn off from this flow the gases required for operation of the turbocharger.

Figure 6:
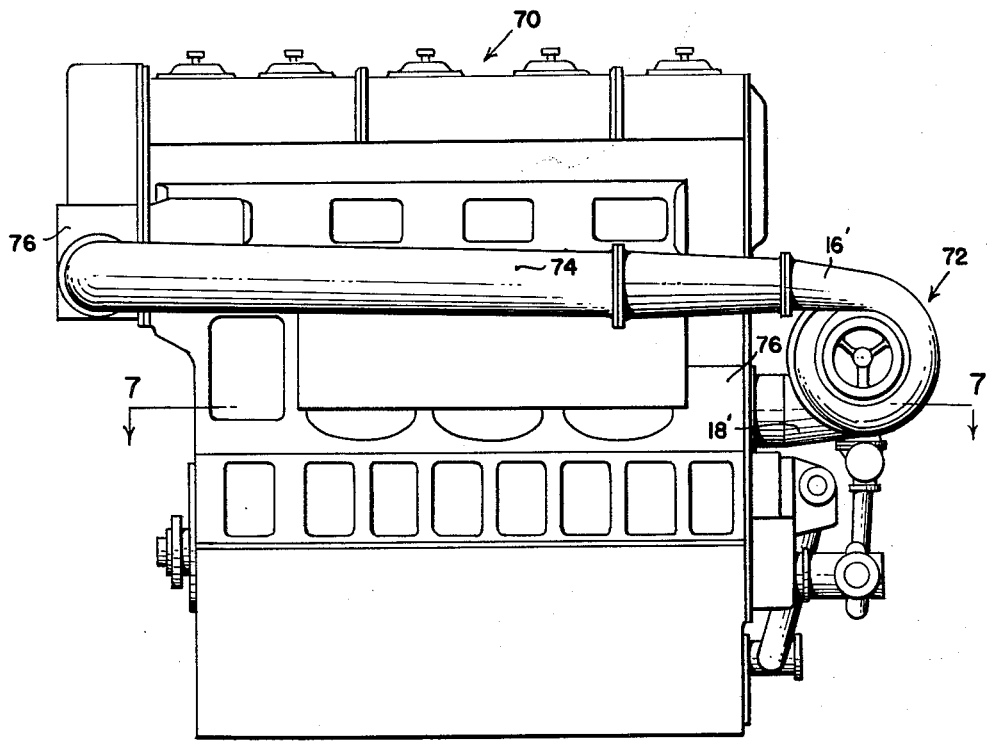
FIGURE 6 is an outline elevation illustrating application of the invention to an opposed piston, two cycle, diesel engine.

The embodiment of the invention illustrated in FIGURE 4 is well suited to two-cycle engines such as those with exhaust valves in the cylinder heads in which the exhaust discharges from each cylinder through a single opening. Other two-cycle diesel engines, however, are provided with two exhaust openings for each cylinder, the term "opening" referring to independent passages as contrasted merely with a plurality of ports discharging into a common passage. Application of the above described version of the pulse converter system to such an engine would, therefore, require two complete pulse converter arrangements, one for each set of discharge openings which are ordinarily on opposite sides of the cylinder block. This would entail the disadvantages of increased complications and cost, increased friction and heat losses due to the larger surface areas involved when the same weight flow was handled in two high velocity devices rather than in a single one, and the necessity for ducting the twin exhausts to a single turbine inlet involving additional complications and additional heat and flow losses. There will now be described with particular reference to FIGURES 6, 7 and 8 the application of the invention to an opposed piston, two-cycle diesel engine of the type involving two exhaust openings for each cylinder. The engine to which specific reference will be made involves the provision of the usual exhaust ports in association with one of the pistons, the lower one, with the inlet ports associated with the other, upper, piston in the case of each cylinder. Only so much of this engine 70 will be described as is required for an understanding of the application of the invention thereto, it being understood that except where changes are noted the engine is of conventional form. FIGURE 6 shows the general arrangement of parts, there being mounted on the engine a turbocharger 72 of the type previously described which delivers compressed air through its outlet 16' to a pipe 74 communicating with the air distribution chamber 76 which, if desired, may include an intercooler. The exhaust gases pass to the turbine from the passage assembly indicated generally at 76 through the turbine inlet 18'.

Figure 8:
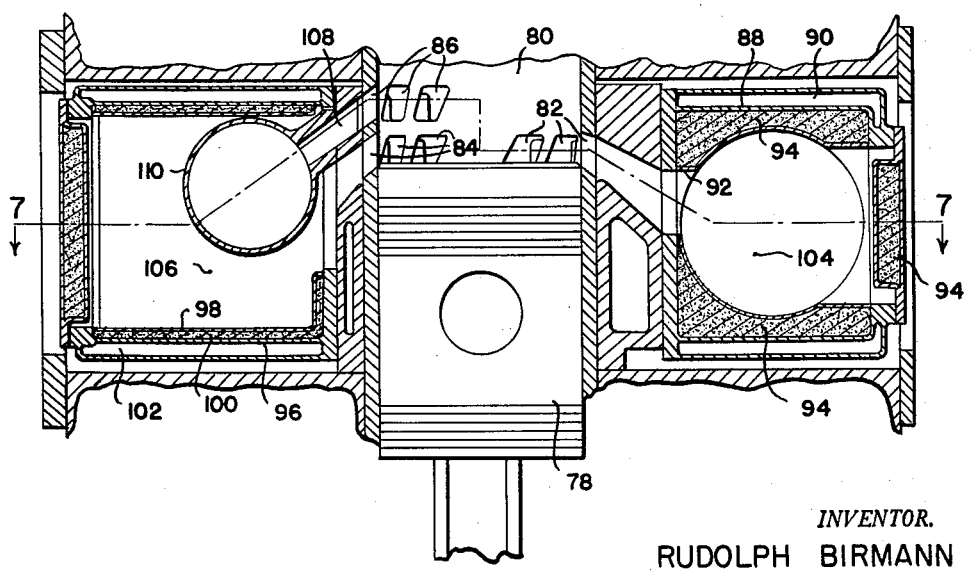
FIGURE 8 is a fragmentary vertical section taken on the plane indicated at 8—8 in FIGURE 7.

Referring now particularly to FIGURE 8, there is indicated at 78 the lower piston in one of the cylinders 80, the piston being illustrated at its outer dead center position. Two sets of exhaust ports are conventionally provided in such an arrangement and are illustrated at 82 and 84. In accordance with the present invention an additional set of exhaust ports 86 is provided at one side of each cylinder.

The exhaust ports 82 communicate with one exhaust manifold 88 extending along the corresponding side of the engine. This exhaust manifold is provided with a water jacket 90. For the application of the present invention, the exhaust manifold is provided with internal lining 92 separated from the manifold wall be insulation 94 to prevent heat loss from the exhaust gases.

The ports 84 of the other set communicate with a second exhaust manifold 96 which is provided with internal lining 98 and insulation 100 to prevent heat loss from the exhaust gases. This manifold is also externally jacketed at 102 for cooling water.

There are thus provided two separate passages 104 and 106 receiving the gases from the respective ports 82 and 84, these passages being heat insulated as described. The ports 86 which are uncovered by the lower piston during its downstroke before the opening of ports 82 and 84 have associated with them the vanes 108 which, as indicated in FIGURE 7, provide nozzle passages directing the exhaust gases emerging from the ports 86 in a direction toward the right in FIGURE 7 with conversion of heat and pressure energy into high velocity jets of the exhaust gases. The nozzle passages thus provided discharge into a series of tubular elements indicated at 110 which are housed within the passage 106. As will be noted from FIGURE 7, the cross sections of the passages through the members 110 increase in succession from the left of that figure toward the right thereof, i.e., in the direction of flow therethrough, each discharging into the next of the series. Each of the tubular members 110 except the extreme left hand one is provided with a flared opening 112 communicating with the passage 106. The left hand member 110 is open to the passage 106 as indicated at 111. The gases flowing through the series of members 110 discharge into the diffuser 114 which discharges into the turbine inlet 18'. At its inlet end the diffuser 114 is also provided with a flared opening 116 to receive gases from the passage 106. A conduit 118 joins the passages 104 and 106 at one end of the engine.

The high pressure ports 86 are desirably so dimensioned that approximately 70% of the exhaust gas weight flow is discharged through them before the low pressure ports 82 and 84 begin to open. The location of the high pressure ports, with reference to the piston travel, is such that the temperature and pressure of the gases discharged are sufficient, under all conditions of engine operation, to actuate the pulse converter system and drive the turbine. The high temperature, high pressure gases, discharging through the high pressure ports 86, contain practically all of the pulsating energy available in the exhaust. This pulsating energy is converted into kinetic energy in the nozzles provided by the vanes 108 which direct the high velocity exhaust gas flow into the high velocity passage through the members 110. It will be noted that this passage is perfectly straight. The high velocity maintained as the result of the aforedescribed utilization of the pulsating exhaust energy produces an eductor action at 111, 112 and 116 causing exhaust gases to be drawn into this passage from the space surrounding it. This space 106 receives the gases exhausting through the ports 82 and 84, the passage being from the former through the connections 104 and 118. The low pressure cylinder ports 82 and 84 are uncovered by the pistons after most of the pulsating exhaust energy has been spent, so that the pressure and temperature of the gases discharging therethrough are relatively low. The flow through the low pressure cylinder ports is therefore composed of residual exhaust gases and excess scavenging air. Flow thereof occurs through the manifolds at low velocity and these gases are aspirated into the high velocity passage. Here they are accelerated to a mean velocity which may, for example, be around 550 to 600 feet per second. They finally enter the diffuser 114 at the downstream end of the high velocity passage. The diffuser serves to convert partially the high velocity into a pressure rise. It extends into the turbine inlet scroll housing in such a manner that the velocity at its outlet is used to drive the turbine without requiring additional transformation into a still higher pressure rise. In other words, the kinetic energy of the gases leaving the diffuser is maintained through the turbine nozzles at least to a very considerable extent.

The advantages of this arrangement are the following:

Only a single diffuser and one set of injector nozzles are used, resulting in simplicity and in minimum surfaces for minimum friction and heat losses.

Since the injector nozzles do not have to serve alternately as eductor nozzles, as is the case in the modification described with reference to FIGURE 4, they can be designed specifically for maximum yield of energy from the high pressure, high temperature gases.

Complete diffusion of the high velocity issuing from the high velocity passage is unnecessary, because the diffuser discharge velocity is utilized directly in the turbine, minimizing diffuser losses.

The entire system has only a single outlet, corresponding to the single turbine inlet, making the complete turbocharger installation very simple.

By virtue of the full utilization of the pulsating energy, in the manner described, there are, in particular, advantages in the operation of a turbocharged operation as follows:

The action of the pulse converter causes flow of combustion and scavenging air to be induced through the engine, even during starting, immediately following the first firing of the engine.

By the self-induction of the engine air flow, brought about by the action of the pulse converter, considerable engine loads may be carried even without the use of the turbocharger. In other words, the turbocharger is itself relieved of a part of its duty by reason of the utilization of the pulsating energy.

In the full-load range of the engine, the action of the pulse converter system makes enough exhaust energy available to the turbine to permit the compressor to develop a high pressure ratio under conditions of relatively low exhaust back pressure. In the event that the high engine compression and firing pressures usually associated with high turbocharger pressure ratio are deemed undesirable, they can be avoided by an appropriate timing of either the inlet or exhaust ports. Regardless of inlet manifold pressure, a suitable timing of the inlet and/or exhaust ports can limit the compression pressure to any desired value. At the same time, the work of compression is reduced due to the lowering of the mean compression temperature brought about by the effect of the intercooler. Lowering of the mean compression temperature lowers the temperature level throughout the entire internal cycle, and makes it possible to increase the brake mean effective pressure of the engine without increasing its thermal loading.

FIGURE 9 illustrates the application of the invention to a loop-scavenging type of engine. In this case the arrangement is single-ended, each piston 120 operating in a cylinder 122 which is ported only near the lower dead center position of the piston. The air intake ports are indicated at 124 and are furnished with air from the charger through the manifold 126. The low pressure exhaust ports 128 are arranged to discharge into the low pressure manifold 130 corresponding to 104 or 106 of the preceding modification. The high pressure ports 132, opened before the low pressure ports 128, discharge through nozzles 133 into the pulse converter arrangement which may correspond to that of the members 110 in the preceding arrangement. It will be evident that the operation is in all respects similar to that of FIGURES 6, 7 and 8 and, accordingly, detailed description need not be provided, the sole difference involved being the path of the scavenging air in loop fashion into the cylinder and thence to the outlet ports.

From the foregoing it will be evident that there is provided a combination of an engine and a charger designed to take care of all requirements thereon ranging from full load to low load conditions, idling conditions, starting, and the insurance of maximum engine power under low speed conditions when the engine has variable speed characteristics of operation.

While the invention has been particularly described with reference to two-cycle diesel engines and is particularly advantageous as applied to them because of their peculiar characteristics, it will be evident that the invention is also applicable to other engines including four-cycle spark ignition type engines which do not involve the same type of starting problems but which under low load conditions provide exhaust gases having insufficient energy content for the proper operation of a turbocharger which has normal operating characteristics for full load conditions. In accordance with the invention the adjustable nozzle arrangement gives a wide operating range to a turbocharger.

It will be apparent that the invention may be embodied in other forms than those indicated and consequently it is not to be understood to be limited except as required by the following claims.

What is claimed is:

1. In combination with a reciprocating multicylinder internal combustion engine, a free-running turbine mechanically independent of the engine, a compressor driven by said turbine, means leading air from said compressor to said engine to charge the engine, exhaust manifold means supplying exhaust gases from the engine to said turbine, said manifold means comprising a plurality of nozzles receiving exhaust gases directly from the engine cylinders, means providing a common space into which said nozzles directly discharge, a diffuser receiving the gases from said space, said common space providing no substantial thermodynamic transformation of the gases between each of said nozzles and said diffuser, means providing a chamber receiving the discharge from said diffuser, and means directing gases from said chamber to said turbine.

2. In combination with a reciprocating multicylinder internal combustion engine, a free-running turbine mechanically independent of the engine, a compressor driven by said turbine, means leading air from said compressor to said engine to charge the engine, exhaust manifold means supplying exhaust gases from the engine to said turbine, said manifold means comprising first and second conduits in series to provide a circulatory passage for the gases, nozzles associated individually with the engine cylinders and discharging into the first conduit to provide high velocity of flow therein, said first conduit having a cross-sectional area monotonically increasing in the direction of flow therethrough, a diffuser receiving gases from the first conduit and discharging into the second conduit, means directing gases from the second conduit into the first conduit, and means directing gases from said second conduit to said turbine.

3. A combination according to claim 2 in which the means directing gases from the second conduit into the first conduit comprises a nozzle for acceleration of the gases flowing therethrough.

4. In combination with a reciprocating multicylinder internal combustion engine, a free-running turbine mechanically independent of said engine, a compressor driven by said turbine, means leading air from said compressor to said engine to charge the engine, exhaust manifold means supplying exhaust gases from the engine to said turbine, said manifold means comprising first and second conduits, nozzles associated individually with the engine cylinders and discharging exhaust gases from the cylinders into the first conduit to provide high velocity of flow therein, a diffuser receiving gases from the first conduit and delivering them to said turbine, means separate from said nozzles directing exhaust gases from the same engine cylinders into the second conduit, and means providing communication between said conduits for flow of gases from the second conduit into the first conduit.

5. A combination according to claim 4 in which the engine has a pair of exhaust openings in each cylinder thereof successively discharging gases during the exhaust strokes of their pistons, and in which said nozzles receive gases from the exhaust openings first discharging during said exhaust strokes, and in which the means directing exhaust gases into the second conduit receives gases from the later discharging exhaust openings.

6. In combination with a reciprocating multicylinder internal combustion engine having a pair of exhaust openings in each cylinder thereof successively discharging gases during the exhaust strokes of their pistons, a free-running turbine mechanically independent of the engine, a compressor driven by said turbine, means leading air from said compressor to said engine to charge the engine, exhaust manifold means for supplying exhaust gases from the engine to said turbine, said manifold means comprising a conduit, nozzles associated individually with the engine cylinders receiving gases from the exhaust openings first discharging during said exhaust strokes and discharging the gases into said conduit to provide high velocity of flow therein, a diffuser receiving gases from said conduit for delivery thereof to said turbine, and means directing gases from the later discharging exhaust openings to said conduit and effecting distribution of said gases to said conduit along the length thereof.

References Cited in the file of this patent

UNITED STATES PATENTS

| | | |
|---|---|---|
| 1,014,401 | Lake | Jan. 9, 1912 |
| 1,370,197 | De Bolotoff | Mar. 1, 1921 |
| 1,477,994 | Buchi | Dec. 18, 1923 |
| 1,543,717 | Madler | June 30, 1925 |
| 2,406,656 | Birmann | Aug. 27, 1946 |